(12) United States Patent
Oh

(10) Patent No.: US 9,862,308 B2
(45) Date of Patent: Jan. 9, 2018

(54) VEHICLE SIDE MIRROR

(71) Applicant: SL Mirrortech Corporation, Siheung, Gyenoggi-Do (KR)

(72) Inventor: Jeong Hun Oh, Gyeongsangbuk-Do (KR)

(73) Assignee: SL Mirrortech Corporation, Siheung, Gyenoggi-do (KR)

( * ) Notice: Subject to any disclaimer, the term of this patent is extended or adjusted under 35 U.S.C. 154(b) by 187 days.

(21) Appl. No.: 14/802,490

(22) Filed: Jul. 17, 2015

(65) Prior Publication Data

US 2016/0059772 A1 Mar. 3, 2016

(30) Foreign Application Priority Data

Aug. 29, 2014 (KR) .................. 20-2014-0006427 U

(51) Int. Cl.
| | | |
|---|---|---|
| *B60Q 1/26* | (2006.01) | |
| *B60R 1/06* | (2006.01) | |
| *B60R 1/12* | (2006.01) | |
| *B60Q 1/00* | (2006.01) | |

(52) U.S. Cl.
CPC ......... *B60Q 1/2665* (2013.01); *B60Q 1/0088* (2013.01); *B60R 1/1207* (2013.01); *B60R 2001/1223* (2013.01)

(58) Field of Classification Search
CPC ... B60C 1/0023; B60C 1/0088; B60C 1/2665; B60C 9/008; B60C 3/258; B60R 1/1207; B60R 2001/1215; B60R 2001/1223; B60R 1/007; G08G 1/167
See application file for complete search history.

(56) References Cited

U.S. PATENT DOCUMENTS

| | | | |
|---|---|---|---|
| 7,944,371 B2 | 5/2011 | Foote et al. | |
| 8,242,896 B2* | 8/2012 | Lynam | B60R 1/1207 340/425.5 |
| 8,599,037 B2 | 12/2013 | Takayanagi | |
| 9,308,867 B2* | 4/2016 | Henion | B60R 1/08 |
| 9,434,313 B2* | 9/2016 | Minikey, Jr. | B60Q 1/2665 |
| 2004/0114384 A1* | 6/2004 | Carter | B60Q 1/2665 362/494 |
| 2011/0260845 A1 | 10/2011 | Henion et al. | |
| 2012/0206930 A1 | 8/2012 | Minikey, Jr. et al. | |
| 2015/0232020 A1* | 8/2015 | Hellin Navarro | B60Q 1/2665 362/516 |

* cited by examiner

*Primary Examiner* — Peggy Neils
(74) *Attorney, Agent, or Firm* — Mintz Levin Cohn Ferris Glovsky and Popeo, P.C.; Kongsik Kim; Colleen H. Witherell

(57) ABSTRACT

A vehicle side mirror is provided and includes a mirror and a mirror housing in which the mirror is installed. Additionally, a blind spot detection (BSD)-integrated mirror holder supports the mirror and includes a mounting groove formed in a front surface thereof that faces the mirror. A BSD module is configured to provide a warning regarding a danger in a blind spot on a rear lateral side of a vehicle and is disposed in the mounting groove.

10 Claims, 17 Drawing Sheets

VEHICLE SIDE MIRROR

CROSS-REFERENCE TO RELATED APPLICATION(S)

This application claims priority from Korean Patent Application No. 20-2014-0006427 filed on Aug. 29, 2014 the disclosure of which is incorporated herein by reference in its entirety.

BACKGROUND

1. Field of the Invention

The present invention relates to a vehicle side mirror, and more particularly, to a vehicle side mirror to which a blind spot detection (BSD) module is integrally coupled to monitor a blind spot on a rear lateral side of a vehicle and warn a driver of a danger.

2. Description of the Related Art

As technology becomes more sophisticated, vehicles have been improved in mobility and usability. Recently, warning systems have been incorporated into vehicles to provide a driver with a warning of the potential obstacles in a blind spot while the vehicle is being driven or a possible collision with an approaching vehicle in the blind spot when the driver is changing lanes. For example, a blind spot detection (BSD) system improves driver convenience by warning the driver of an obstacle in a blind spot on a rear lateral side of the vehicle or of an approaching vehicle on the rear lateral side of the vehicle.

FIG. 1 is a detailed view of a vehicle side mirror having a BSD function according to the related art. FIG. 2 is a plan view of the vehicle side mirror having the BSD function according to the related art. FIG. 3 is a cross-sectional view of the vehicle side mirror having the BSD function according to the related art.

Referring to FIGS. 1 and 2, the conventional vehicle side mirror having the BSD function includes a mirror 5 and a mirror holder 10 that supports the mirror 5 and fixes the mirror 5 to a housing (not illustrated). The mirror holder 10 includes an assembly aperture 11 into which a BSD assembly 20 for implementing the BSD function is inserted. Particularly, the BSD assembly 20 may include a lighting unit 21 configured to display a warning signal on the mirror 5 and a wire 27 and a connector 29 configured to deliver power from a power source of a vehicle to the lighting unit 21. The BSD assembly 20 may be detachably coupled to the mirror holder 10, may be coupled to a rear side of the mirror holder 10, and may be exposed on the exterior of the mirror holder 10. In other words, the BSD assembly 20 may be detachably coupled to the mirror holder 10 to be exposed.

Referring to FIG. 3, the lighting unit 21 disposed in the assembly aperture 11 includes a printed circuit board (PCB) 23, a plurality of light sources 24 mounted on the PCB 23, and a lens 25 through which light irradiated from the light sources 24 passes. Since the BSD assembly 20, in particular, the lighting unit 21 is detachably coupled to the mirror holder 10 to be exposed, the lighting unit 21 may move out of position or come loose (e.g., detach) from the mirror holder 10, allowing moisture, etc. to be more easily introduced there into. In addition, since the wire 27 and the connector 29 of the BSD assembly 20 are exposed, these components may also move out of position, detach from the mirror holder 10, or be caught on an object. Further, the detachable BSD assembly 20 creates joints, thus reducing the ease of assembly.

SUMMARY

Aspects of the present invention provide a vehicle side mirror to which a blind spot detection (BSD) module may be integrally coupled to monitor a blind spot on a rear lateral side of a vehicle and provide a warning to a driver of a danger. Thus, the vehicle side mirror of the claimed invention prevents the mirror from being exposed. However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, a vehicle side mirror may include: a mirror; a mirror housing in which the mirror is installed; and a BSD-integrated mirror holder that supports the mirror and may include a mounting groove formed in a front surface thereof that faces the mirror. Additionally, a BSD module configured to provide a warning regarding a danger in a blind spot on a rear lateral side of a vehicle may be disposed in the mounting groove.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
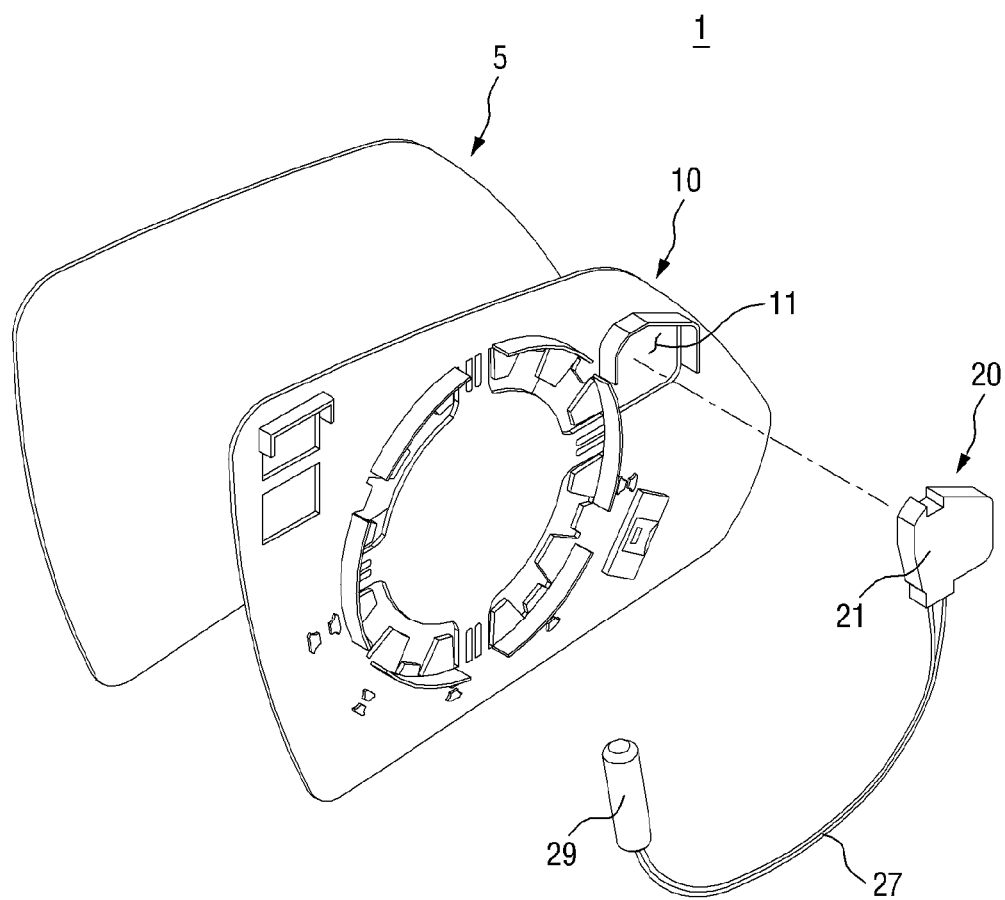
FIG. 1 is a detailed view of a vehicle side mirror having a blind spot detection (BSD) function according to the related art.
Figure 2:
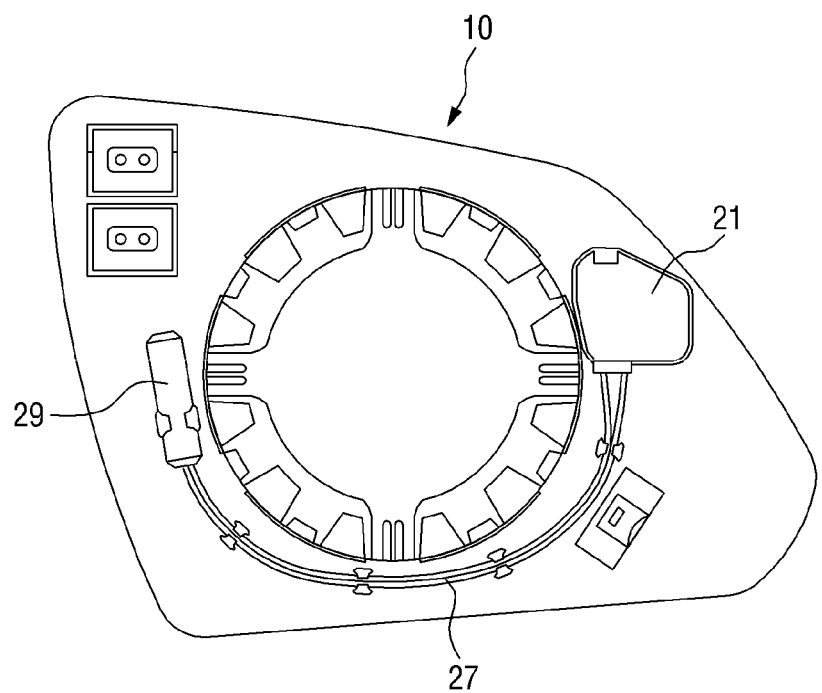
FIG. 2 is a plan view of the conventional vehicle side mirror having the BSD function according to the related art.
Figure 3:
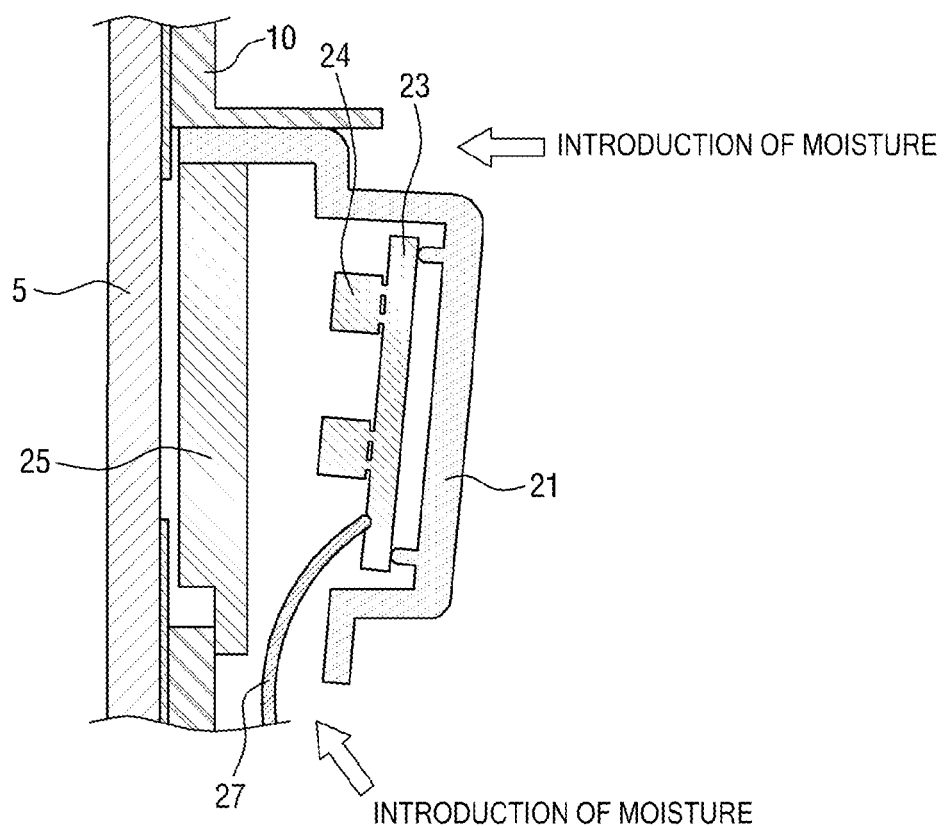
FIG. 3 is a cross-sectional view of the conventional vehicle side mirror having the BSD function according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present invention.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention will now be described more fully with reference to the accompanying drawings.

Figure 4:
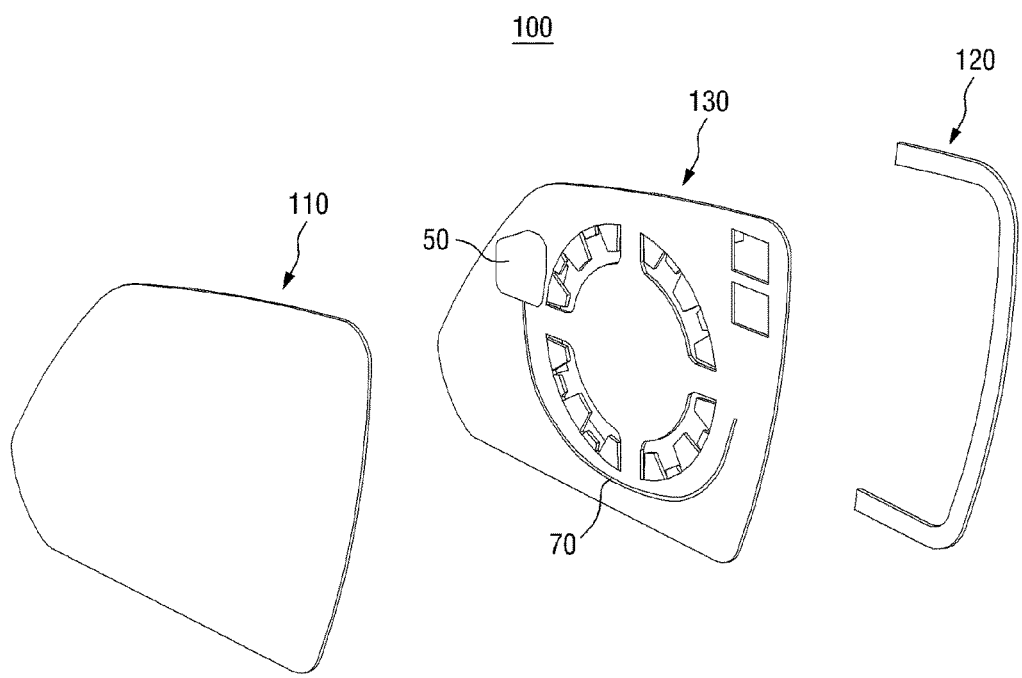
FIG. 4 is a detailed view of a vehicle side mirror according to an exemplary embodiment of the present invention.
Figure 5:
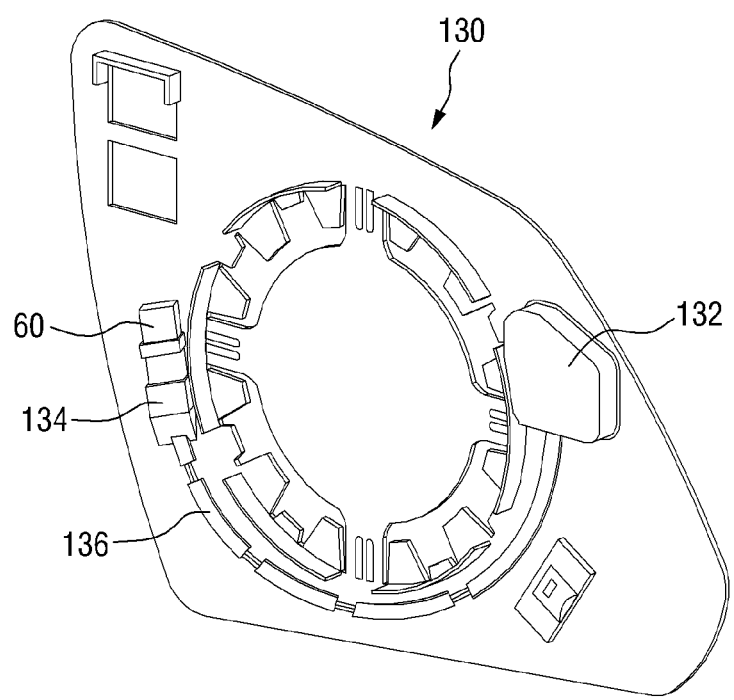
FIG. 5 is a view of a BSD-integrated mirror holder of the vehicle side mirror of FIG. 4 according to an exemplary embodiment of the present invention.
Figure 6:
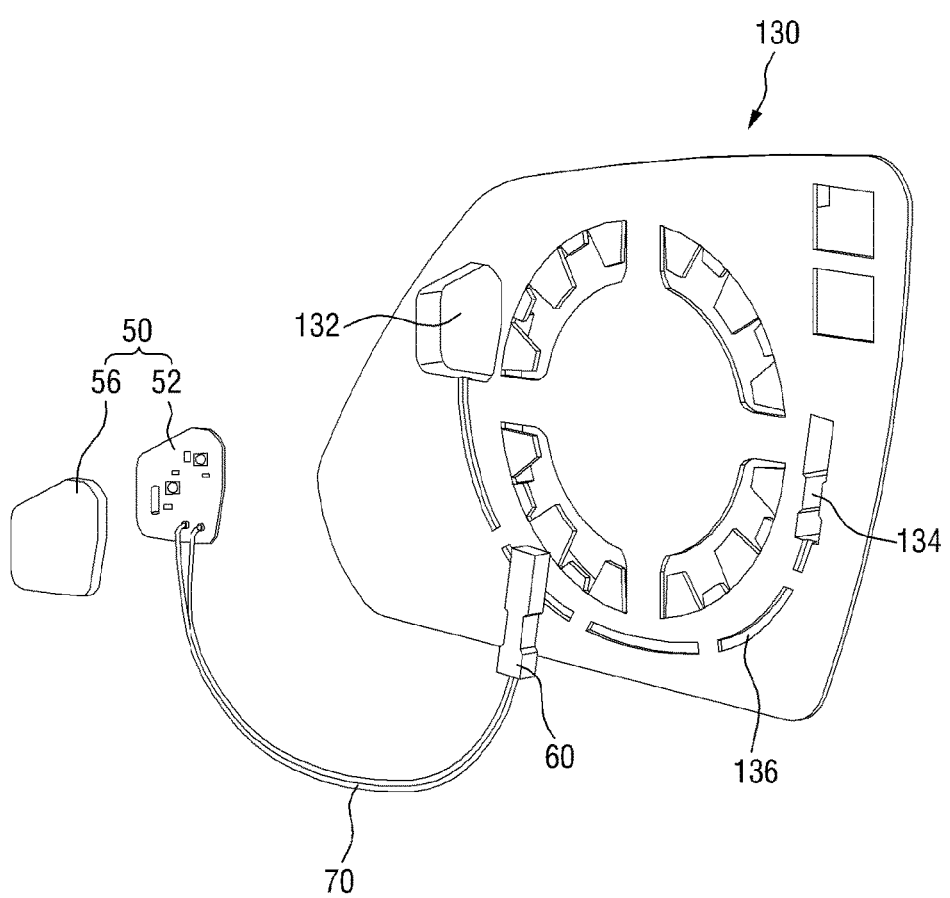
FIG. 6 illustrates the installation state of the BSD-integrated mirror holder of the vehicle side mirror of FIG. 4 according to an exemplary embodiment of the present invention.

FIG. 4 is a detailed perspective view of a vehicle side mirror 100 according to an exemplary embodiment of the present invention. FIG. 5 is a view of a blind spot detection (BSD)-integrated mirror holder 130 of the vehicle side mirror 100 of FIG. 4. FIG. 6 illustrates the installation state of the BSD-integrated mirror holder 130 of the vehicle side mirror 100 of FIG. 4. Referring to FIGS. 4 through 6, the vehicle side mirror 100 may include a mirror 110, a mirror housing 120, and the BSD-integrated mirror holder 130. The mirror 110 may be installed within the mirror housing 120, and the BSD-integrated mirror holder 130 may be installed between the mirror 110 and the mirror housing 120.

In particular, the BSD-integrated mirror holder 130 supports the mirror 110, and a BSD module 50 configured to provide a warning regarding a danger in a blind spot on a rear lateral side of a vehicle may be disposed in a mounting groove 132 formed in a front surface of the BSD-integrated mirror holder 130 which faces the mirror 110. Since the BSD module 50 may be integrally coupled to the BSD-integrated mirror holder 130, shifting out of position or detaching from the BSD-integrated mirror holder 130 may be prevented. In addition, this structure creates no joints and thus no gaps, thereby blocking the introduction of moisture, etc. Accordingly, watertight performance may be secured.

The BSD module 50 may include a printed circuit board (PCB) 52 installed on an inner surface of the mounting groove 132 of the BSD-integrated mirror holder 130, one or more light sources 54 mounted on a surface of the PCB 52 to irradiate light, and a lens 56 installed in front of the light sources 54 to direct light emitted from the light sources 54 in a predetermined direction.

Particularly, the light sources 54 may be light-emitting diodes (LEDs) which emit excess energy as light when injected electrons and holes recombine. Due to the advantages of low voltage and low power consumption, the LED is being used as a light source for optical coupled devices. The light sources 54 such as LEDs have high energy efficiency (e.g., high light conversion efficiency and low power consumption), have a longer lifespan, and constitute the BSD module 50 with low voltage and low power consumption. In addition, it will be obvious to those of ordinary skill in the art that each of the light sources 54 may be any type of device (e.g., an organic light-emitting diode (OLED) or a laser diode) using an electroluminescent effect.

The BSD module 50 using LEDs as the light sources 54 may provide reduced eye fatigue due to a color temperature of approximately 5500 K, increase the freedom of design due to a minimized size, and is economical due to a semi-permanent life. The light sources 54 such as LEDs may be mounted on the PCB 52 to emit light toward the lens 56.

The LEDs may be arranged in an axial direction of the lens 56 to form a desired warning pattern or may be offset to allow a desired amount of light to reach the lens 56. In addition, the PCB 52 may include a terminal (not illustrated) connected to an external power source by a wire 70 and a connector 60. Thus, the PCB 52 may be configured to receive power from a vehicle battery. The PCB 52 may further be configured to supply power to the light sources 54 such as LEDs that convert electrical energy into light energy and operate the light sources 54. Accordingly, a circuit pattern may be formed on the PCB 52.

The lens 56 may have a pattern designed to obtain a desired lighting pattern from the light sources 54 disposed behind the lens 56. The lens 56 may be used to collect light from the light sources 54 and direct the collected light toward the mirror 110 at a predetermined angle. After the lens 56 is mounted in the mounting groove 132 of the BSD-integrated mirror holder 130, a tape or other adhesive may be attached to improve watertightness (e.g., provide a watertight seal). The lens 56 may further include a guide rib 57. The guide rib 57 will be described in detail later.

In addition, the BSD-integrated mirror holder 130 may include the connector 60 and the wire 70 to deliver power to the BSD module 50. Accordingly, a connector insertion groove 134 and a wire insertion groove 136 into which the connector 60 and the wire 70 are respectively inserted may be formed in the BSD-integrated mirror holder 130. The connector insertion groove 134 may be specifically formed in the front surface of the BSD-integrated mirror holder 130 which faces the mirror 110 to be separated from the mounting groove 132 in which the BSD module 50 is disposed. The wire insertion groove 136 may extend between the mounting groove 132 and the connection insertion groove 134.

In particular, the wire insertion groove 136 may extend continuously or discontinuously. The BSD module 50 may be disposed in the mounting groove 132, the connector 60 may be disposed in the connector insertion groove 134, and the wire 70 may connect the BSD module 50 and the connector 60. The wire 70 may be inserted into the wire insertion groove 136 with an end (e.g., a first end) connected to the connector 60 and the other end (e.g., a second end) connected to the PCB 52. In addition, power supplied from a battery (not illustrated) of the vehicle may be delivered to the PCB 52 via the connector 60 and the wire 70. The specific structure of each of the connector insertion groove 134 and the wire insertion groove 136 will be described later.

Figure 7:
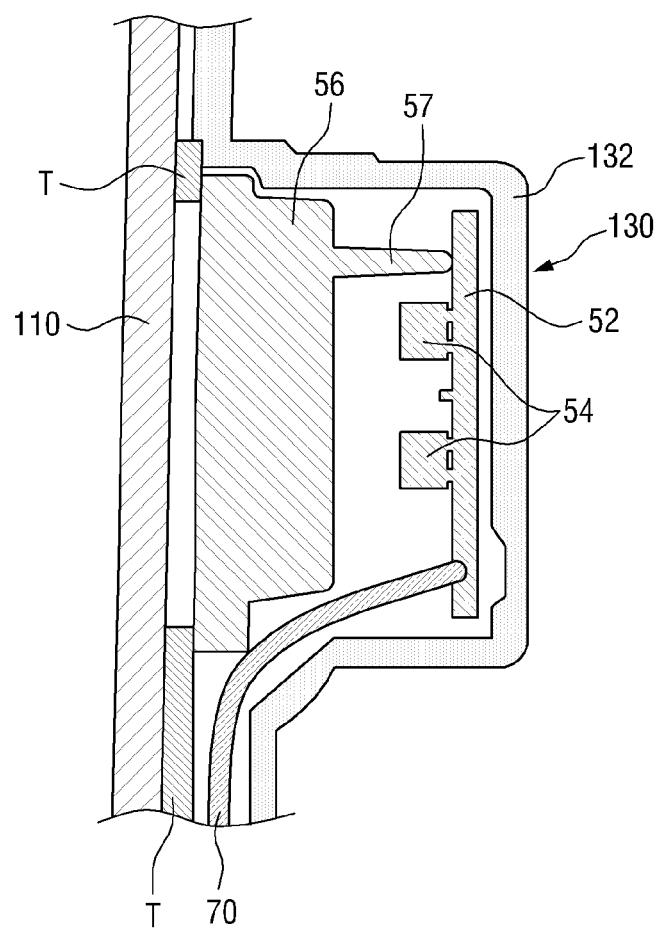
FIG. 7 is a cross-sectional view of the vehicle side mirror of FIG. 4 according to an exemplary embodiment of the present invention.

FIG. 7 is a cross-sectional view of the vehicle side mirror 100 of FIG. 4. Referring to FIG. 7, in the vehicle side mirror 100 according to the current exemplary embodiment, the BSD module 50 may be integrally inserted into the mounting groove 132 of the BSD-integrated mirror holder 130. Therefore, the BSD module 50 may be prevented from moving out of position (e.g., shifting out of position) or detaching from the BSD-integrated mirror holder 130 and from forming joints with other parts. In addition, the lens 56 may include the guide rib 57 which protrudes toward the PCB 52. Particularly, a tip end of the guide rib 57 may be in tight contact with (e.g., may abut) the PCB 52. Therefore, the vehicle side mirror 100 may be assembled more tightly, that is, with an improved airtight or watertight seal. In addition, a tape T, or any other adhesive, may be attached to a region of the lens 56 and a region of the mounting groove 132 of the BSD-integrated mirror holder 130 to eliminate gaps and thus prevent the introduction of moisture, foreign matter, etc. (e.g., improve the seal between the components).

Further, since the wire 70, etc. may be prevented from shifting out of position or detaching from the BSD-integrated mirror holder 130, coupling performance may be improved.

Figure 8:
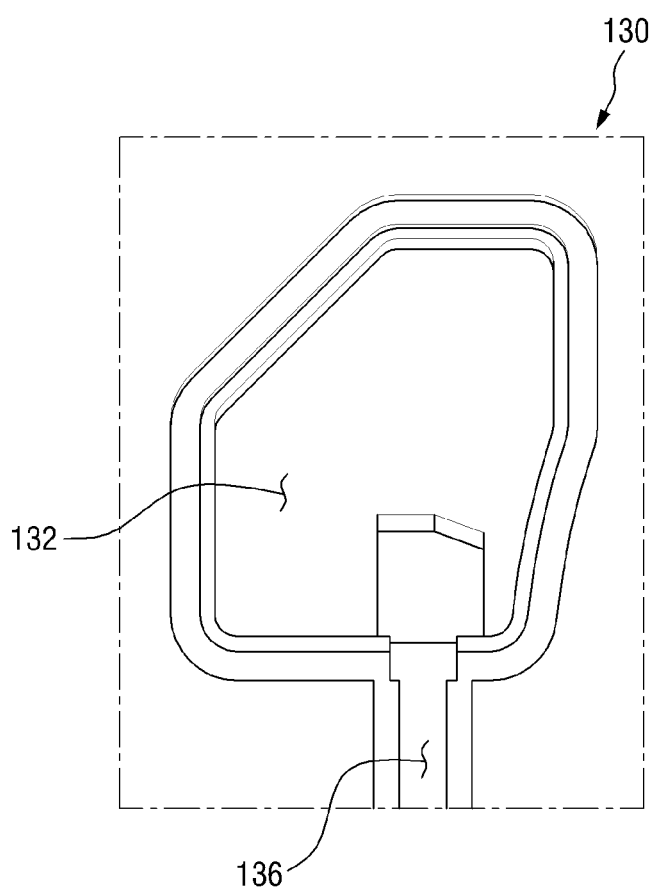
FIG. 8 illustrates a mounting groove of the BSD-integrated mirror holder of FIG. 5 according to an exemplary embodiment of the present invention.

FIG. 8 illustrates the mounting groove 132 of the BSD-integrated mirror holder 130 of FIG. 5. Referring to FIG. 8, the mounting groove 132 may be formed in the BSD-integrated mirror holder 130 to integrally couple the BSD module 50 to the BSD-integrated mirror holder 130. The mounting groove 132 may be open on one side, and the BSD module 50 may be mounted in the mounting groove 132 through the open side. In addition, the mirror 110 may be disposed in front of the BSD module 50. Therefore, the BSD module 50 may be integrally coupled to the BSD-integrated mirror holder 130 and may be prevented from being exposed to the exterior. Further, the wire insertion groove 136 into which the wire 70 is inserted may extend from a side of the mounting groove 132 or may be separated from the mounting groove 132 by a predetermined distance.

Figure 9A:
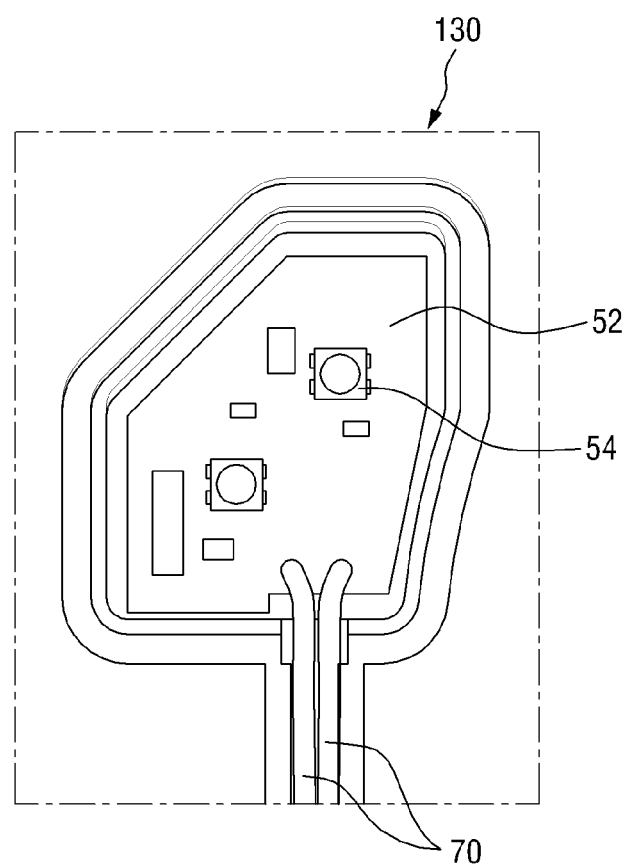
FIGS. 9A and 9B illustrate a printed circuit board (PCB) and light sources mounted in the mounting groove of the BSD-integrated mirror holder of FIG. 8 according to an exemplary embodiment of the present invention.
Figure 9B:
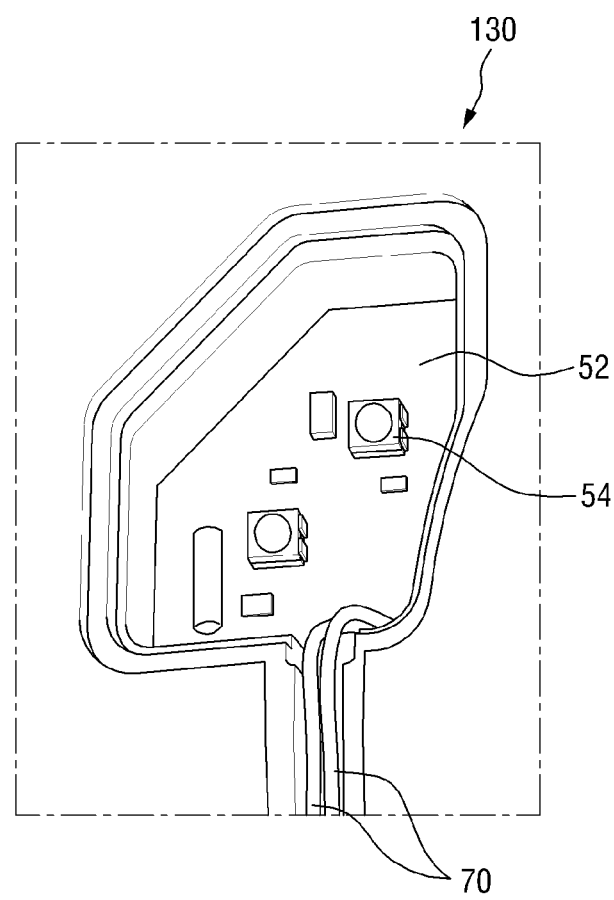
Figure 10:
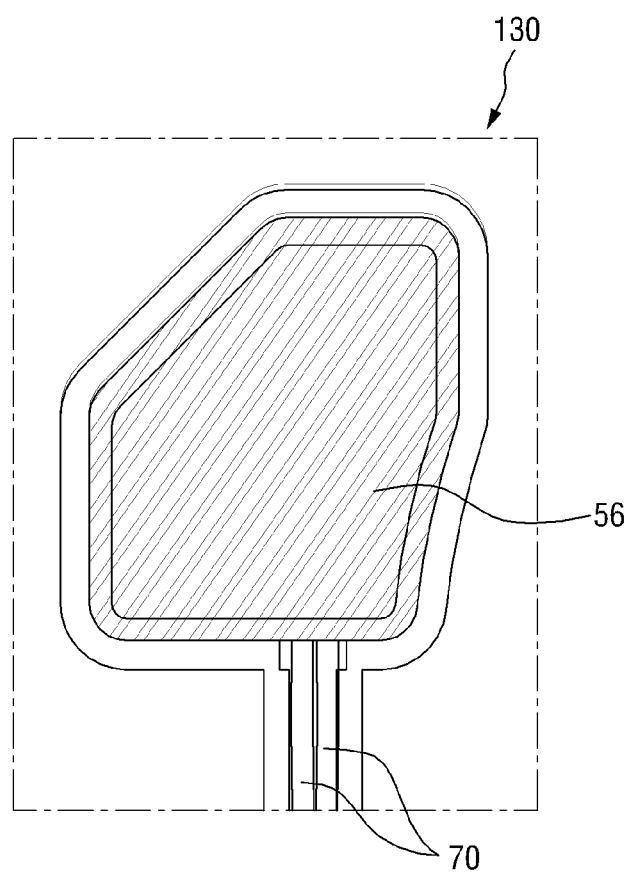
FIGS. 10 and 11 illustrate a lens and a tape attached onto the PCB and the light sources mounted in the mounting groove of FIGS. 9A and 9B according to an exemplary embodiment of the present invention.
Figure 11:
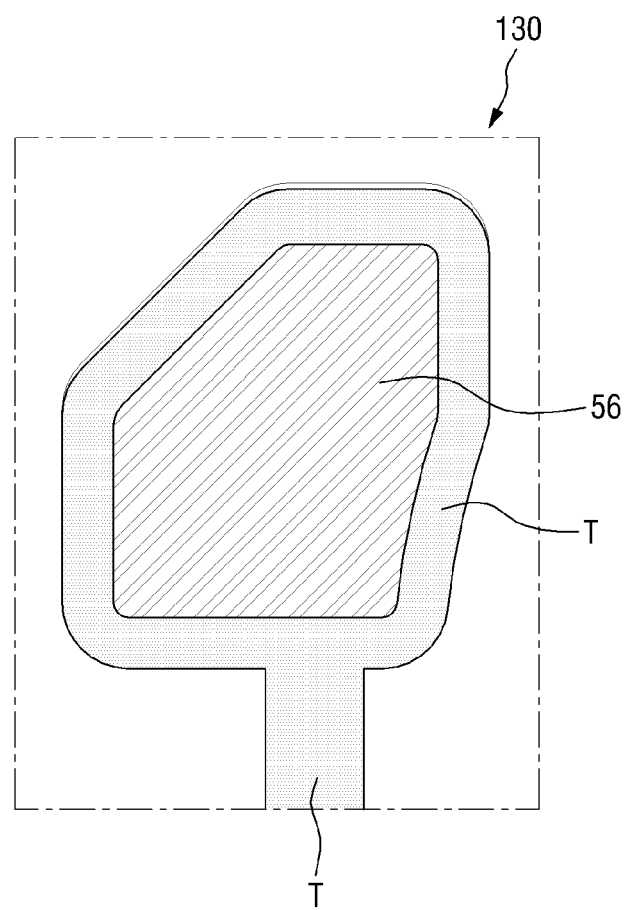

FIGS. 9A and 9B illustrate the PCB 52 and the light sources 54 mounted in the mounting groove 132 of the BSD-integrated mirror holder 130 of FIG. 8. FIGS. 10 and 11 illustrate the lens 56 and the tape T attached onto the PCB 52 and the light sources 54 mounted in the mounting groove 132 of FIGS. 9A and 9B. Referring to FIGS. 9A and 9B, the PCB 52 on which the light sources 54 are mounted may be disposed in the mounting groove 132 and may be connected to the wire 70. Further, the PCB 52 may be configured to receive power via the wire 70, supply the received power to the light sources 54, and operate the light sources 54. The PCB 52 may be executed by a controller.

In addition, referring to FIGS. 10 and 11, after the PCB 52 is disposed in the mounting groove 132, the lens 56 may be disposed on the PCB 52. Then, the tape T may be attached to fill a gap between the lens 56 and the mounting groove 132. The tape T may also be attached onto the wire 70 connected to the PCB 52, to prevent the introduction of moisture, foreign matter, etc.

Figure 12A:
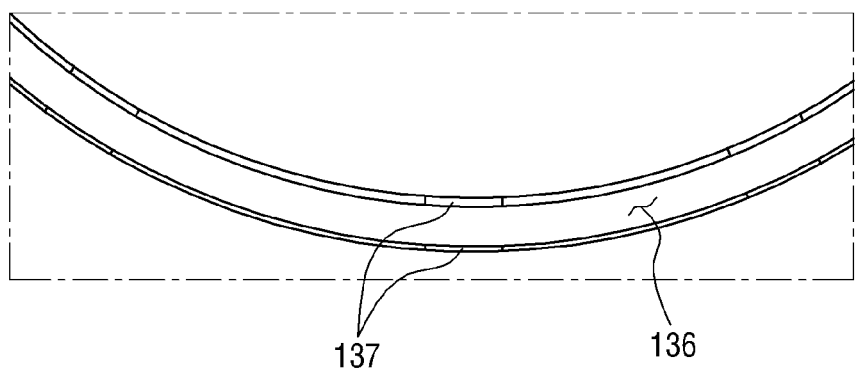
FIGS. 12A and 12B illustrate a wire insertion groove of the BSD-integrated mirror holder of FIG. 8 and a wire inserted into the wire insertion groove according to an exemplary embodiment of the present invention.
Figure 12B:
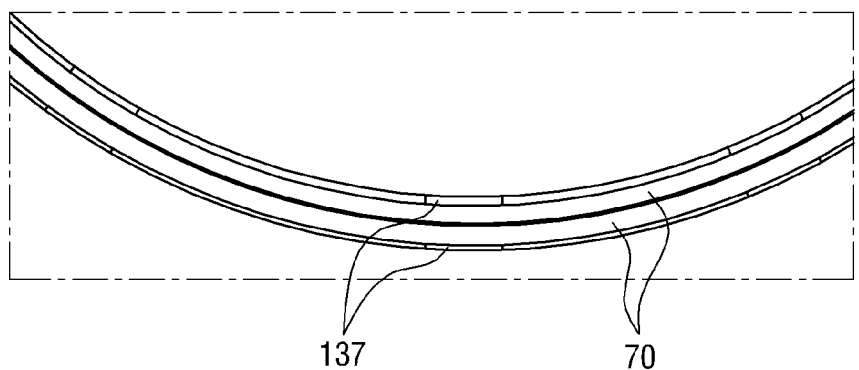

FIGS. 12A and 12B illustrate the wire insertion groove 136 of the BSD-integrated mirror holder 130 of FIG. 8 and the wire 70 inserted into the wire insertion groove 136. Referring to FIGS. 12A and 12B, the wire insertion groove 136 may be formed between the connector insertion groove 134 and the mounting groove 132. The wire insertion groove 136 may have a predetermined curvature to prevent the wire 70 from twisting (e.g., becoming tangled).

In addition, the wire insertion groove 136 may further include a plurality of fitting protrusions 137 for coupling and fixing the wire 70 to the wire insertion groove 136. The fitting protrusions 137 may be formed on inner sidewalls of the wire insertion groove 136. The fitting protrusions 137 may be arranged at regular intervals to improve the coupling performance of the wire 70 to prevent the wire 70 from shifting out of position or detaching from the wire insertion groove 136. As described above, the tape T may be attached onto the wire insertion groove 136 and along the wire insertion groove 136 to prevent the introduction of foreign matter, etc.

Figure 13A:
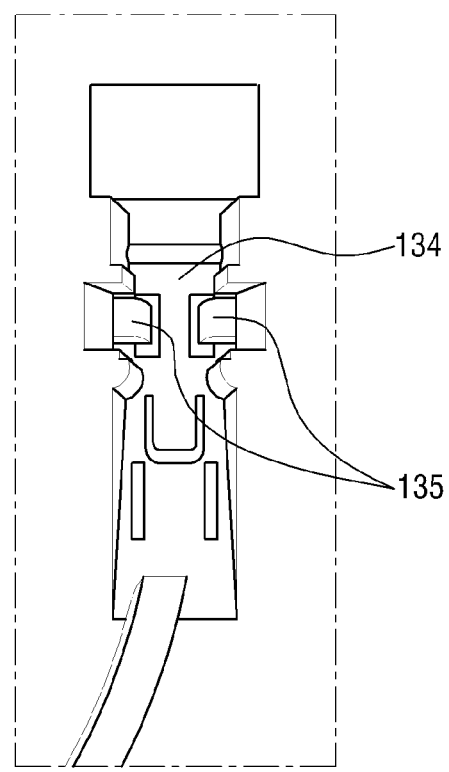
FIG. 13A illustrates a connector insertion groove of the BSD-integrated mirror holder of FIG. 8 according to an exemplary embodiment of the present invention.
Figure 13B:
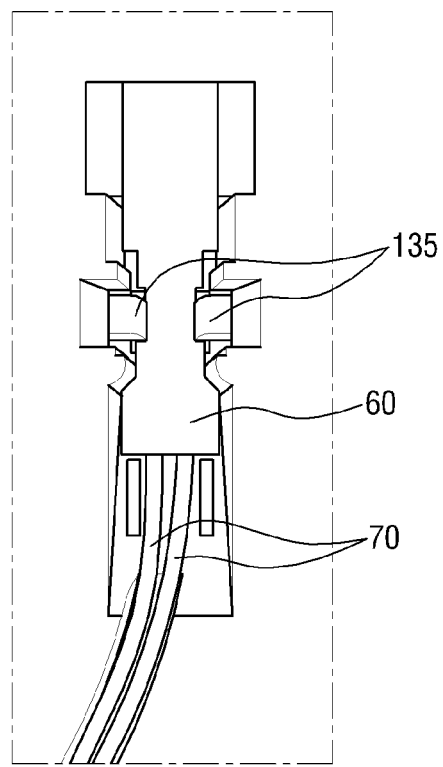
FIGS. 13B and 13C illustrate a connector inserted into the connector insertion groove according to an exemplary embodiment of the present invention.
Figure 13C:
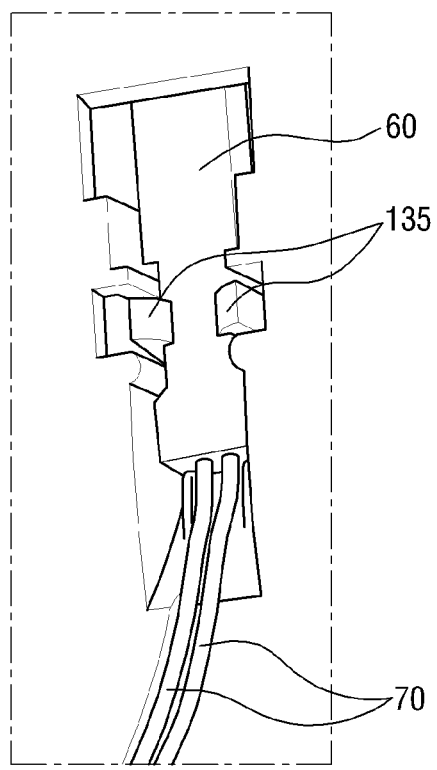

FIG. 13A illustrates the connector insertion groove 134 of the BSD-integrated mirror holder 130 of FIG. 8. FIGS. 13B and 13C illustrate the connector 60 inserted into the connector insertion groove 134. Referring to FIGS. 13A and 13B, the connector insertion groove 134 of the BSD-integrated mirror holder 130 may further include hook protrusions 135 for coupling and fixing the connector 60 to the connector insertion groove 134. The hook protrusions 135 may be hooked to the connector 60 when the connector 60 is inserted into the connector insertion groove 134. Accordingly, the hook protrusions 135 may improve the coupling performance of the connector 60 to prevent the connector 60 from shifting out of position or detaching from the connector insertion groove 134.

After the BSD module 50 is disposed in the mounting groove 132 of the BSD-integrated mirror holder 130, after the connector 60 is inserted into the connector insertion groove 134, and after the wire 70 is inserted into the wire insertion groove 136, the mirror 110 may be disposed on the front surface of the BSD-integrated mirror holder 130 and then coupled to the mirror housing 120. Accordingly, the BSD module 50, the connector 60, and the wire 70 may be prevented from being exposed to the exterior and thus may be prevented from shifting out of position, detaching from the BSD-integrated mirror holder 130, or the like. Consequently, the coupling performance of each part may be improved.

Figure 14:
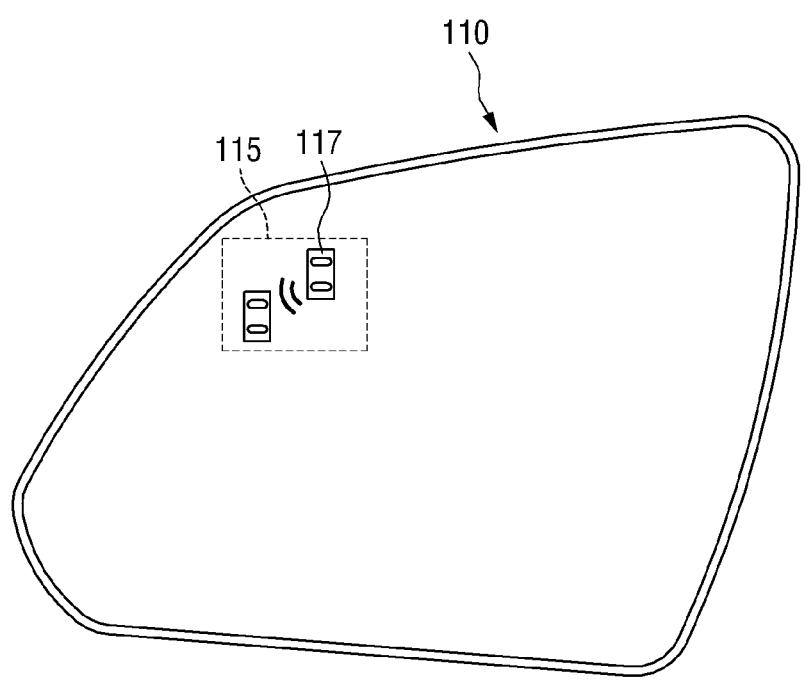
FIG. 14 illustrates a warning pattern displayed on the vehicle side mirror of FIG. 1 according to an exemplary embodiment of the present invention.

FIG. 14 illustrates a warning pattern 117 displayed on the vehicle side mirror 100 of FIG. 1. Referring to FIG. 14, in the vehicle side mirror 100 of FIG. 1, a region 115 may be formed by partially etching the mirror 110. The warning pattern 117 formed by the BSD module 50 may be displayed on the region 115 formed by partially etching the mirror 110. The warning pattern 117 may be displayed as an icon that indicates an approaching vehicle but is not limited to the icon as will be obvious to those of ordinary skill in the art.

According to the present invention, a BSD module for monitoring a blind spot on a rear lateral side of a vehicle and providing a warning to a driver of a danger may be integrally coupled to a side mirror to be not exposed. In addition, since the BSD module may be integrally coupled to the side mirror to be not exposed, gaps between parts may be eliminated, thereby improving watertight performance. In addition, the ease of assembly may be improved.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A vehicle side mirror, comprising:
    a mirror;
    a mirror housing in which the mirror is installed; and
    a blind spot detection (BSD)-integrated mirror holder which supports the mirror and includes a mounting groove formed in a front surface of the BSD-integrated mirror holder that faces the mirror,
    wherein a BSD module configured to provide a warning regarding a danger in a blind spot on a rear lateral side of a vehicle is disposed in the mounting groove,
    wherein the BSD module includes:
    a printed circuit board (PCB) installed on an inner surface of the mounting groove;
    one or more light sources mounted on a surface of the PCB to irradiate light; and
    a lens installed in front of the light sources to direct light irradiated from the light sources in a predetermined direction,
    wherein the lens further includes: a guide rib that protrudes toward the PCB,
    wherein a tip end of the guide rib contacts the PCB,
    wherein the mounting groove is open on one side, and the BSD module is mounted in the mounting groove through the open side, and
    wherein the BSD module is integrally coupled to the BSD-integrated mirror holder and is prevented from being exposed to the exterior.

2. The vehicle side mirror of claim 1, wherein the light sources are light-emitting diodes (LEDs).

3. The vehicle side mirror of claim 2, wherein a tape is attached onto a region of the lens and a region of the mounting groove.

4. The vehicle side mirror of claim 1, wherein the BSD-integrated mirror holder further includes:
    a connector inserted into a connector insertion groove formed in the front surface that faces the mirror to be separated from the mounting groove; and
    a wire inserted into a wire insertion groove extending between the mounting groove and the connector insertion groove.

5. The vehicle side mirror of claim 4, wherein the wire has a first end connected to the connector and a second end connected to the PCB.

6. The vehicle side mirror of claim 4, wherein the connector insertion groove further includes:
    a plurality of hook protrusions for coupling and fixing the connector.

7. The vehicle side mirror of claim 4, wherein the wire insertion groove further includes:
    a plurality of fitting protrusions for coupling and fixing the wire.

8. The vehicle side mirror of claim 7, wherein a tape is attached along the wire insertion groove.

9. The vehicle side mirror of claim 1, wherein the mirror includes a display region formed by etching a region of the mirror.

10. The vehicle side mirror of claim 9, wherein a warning pattern formed by the BSD module is displayed in the display region of the mirror.

* * * * *